United States Patent
Weigelt

(10) Patent No.: US 6,546,474 B1
(45) Date of Patent: Apr. 8, 2003

(54) METHOD AND SYSTEM FOR THE FAST BACKUP AND TRANSMISSION OF DATA

(75) Inventor: Guenter Weigelt, Gaeufelden (DE)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 09/633,490

(22) Filed: Aug. 7, 2000

(30) Foreign Application Priority Data

Aug. 7, 1999 (DE) .......................... 199 37 423

(51) Int. Cl.[7] .............................. G06F 12/08
(52) U.S. Cl. ................ 711/162; 711/111; 711/208; 714/6
(58) Field of Search ................ 711/162, 161, 711/209, 208, 111, 112; 714/6

(56) References Cited

U.S. PATENT DOCUMENTS

| | | | | |
|---|---|---|---|---|
| 5,664,186 A | * | 9/1997 | Bennett et al. | 707/204 |
| 5,745,686 A | * | 4/1998 | Saito et al. | 711/216 |
| 5,794,042 A | * | 8/1998 | Terada et al. | 717/101 |
| 5,909,700 A | * | 6/1999 | Bitner et al. | 711/161 |
| 6,148,412 A | * | 11/2000 | Cannon et al. | 714/6 |
| 6,311,240 B1 | * | 10/2001 | Boone et al. | 710/74 |
| 6,421,711 B1 | * | 7/2002 | Blumenau et al. | 711/153 |
| 6,446,141 B1 | * | 9/2002 | Nolan et al. | 710/8 |

OTHER PUBLICATIONS

Innovation Data Processing, "Program Product Newsletter vol. 26.1", Sep. 1998, pp. 1–6.*
www.iccmforum.com, "Duplicate MVS vols.?", 2002.*

* cited by examiner

Primary Examiner—Matthew Kim
Assistant Examiner—Pierre-Michel Bataille
(74) Attorney, Agent, or Firm—Abdy Raissinia; Bracewell & Patterson, L.L.P.

(57) ABSTRACT

In accordance with the present invention, the fastest possible one-to-one copying of data files which are to be backed up is performed from a source storage medium to a target storage medium. The data files include usable data and management data. After the copying, data held on the source storage medium is accessible to users during the backup. To perform the backup, a record table or synonym list provides access to the files which have been copied. From the record table, management data is temporarily replaced in order to meet access requirements for opening the copied data files at the target storage medium. The copied management data and useful data on the target storage medium remain unchanged. Advantageously, copied data files on the target storage medium can no longer be changed after copying and apart from the authorized backup program, no application can read the copied data files from the target storage medium.

30 Claims, 3 Drawing Sheets

| Source Catalog Name | Target Catalog Name |
|---|---|
| Source Catalog Password | Target Catalog Password |
| Source VOLID1 | Target VOLID1 |
| Source VOLID2 | Target VOLID2 |
| .................. | .................. |
| Source VOLIDn | Target VOLIDn |
| End of Table | |

| Source Catalog Name | Target Catalog Name |
|---|---|
| Source Catalog Password | Target Catalog Password |
| Source VOLID1 | Target VOLID1 |
| Source VOLID2 | Target VOLID2 |
| ......... | ......... |
| Source VOLIDn | Target VOLIDn |
| End of Table | |

METHOD AND SYSTEM FOR THE FAST BACKUP AND TRANSMISSION OF DATA

BACKGROUND OF THE INVENTION

1. Technical Field

The present invention relates in general to a data processing system and, in particular, to a method and system for fast backup and transmission of data. Still more particularly, the present invention relates to a method and system for fast backup and transmission of data to ensure that the data cannot be altered.

2. Description of the Related Art

To protect data holdings from being lost, there is a need for a regular process in which the data is saved or backed up on a data storage media. This regular process of saving data is often referred to as performing a "backup".

Because of the increasing volumes of data being stored and the more insistent demands for data security, the amount of data being backed up and the frequency of scheduled backups continues to increase in many systems.

Conventionally, backups are performed at times other than the "on-line times", such as at night, and the backed-up data is stored on magnetic tape, magnetic disk, or other media at secure locations. In the event of data being lost, a user can retrieve data from the most recent backup in order to keep the loss as small as possible.

In particular, backups are typically performed during the night shift because the data must not change during a backup. A change in data during a backup typically causes synchronization problems. However, as the volumes of data being backed up are becoming larger and larger, the night is often not long enough to allow all the necessary data to be backed up.

Given the demand for faster backup facilities, the International Business Machines (IBM) RAMAC (Random Access Memory) Virtual Array (IBM RVA) magnetic disk storage system was developed which has an "IXFP(IBM Extended Facilities Product)/SnapShot™" function, referred to in what follows as "SnapShot".

This SnapShot function allows entire disks to be copied in a very short time, e.g. from seconds to minutes. Once the disks have been copied, then on-line operation can start and all the backups can be made from the copies at any other time.

Details of the SnapShot function can be found in the technical specification relating to Snapshot. For the purposes of the present invention, it is desirable that copies of disks can be made in a very short time by a function such as Snapshot. Since the present invention is not dependent on the SnapShot function as the only method of quickly copying disks, the term "copied disks" will be used in the following description to refer to "Snapshot" copies and other conceivable methods of copying disks.

Copied disks as a basis for backups are disadvantageous in that after a copy is performed by SnapShot it may not be possible for various databases and file systems which utilize particular methods of access and identification, e.g. which rely on the source disk name, to be further processed or saved. For this reason the fast copy performed by SnapShot cannot readily be used as a basis for backups by most operating systems.

Certain operating systems that are enabled to utilize copied disks as a basis for backups change the disk (i.e. volume) identification (referred to below as "VOLID"), thus avoiding "duplicate names". This is the method utilized by, for example, the IBM OS/390 operating system. However, this method of changing the disk VOLID only works because in the OS/390 operating system the files are described or denoted by simple catalogue structures.

In addition, while some operating system, such as OS/390, provide for making changes to the VOLIDs during backups, there are certain crucial drawbacks to making changes to the copied disks as a basis for backups. First, it is only possible to make changes to the copied disks if there are no catalog structures denoting the files or if the catalog structures which do denote them are simple. If the structures are complicated, errors may be caused by making changes to copied disks and the process of making changes is time-consuming. Second, making changes to the copied disks goes against the normal backup philosophy by changing a "frozen", or unchanged, data holding at a later stage. Third, the data holdings on the amended disks could be changed by ordinary applications. Finally, the amended data cannot be copied straight back to the original source disk for disaster recovery. Therefore, it is generally safer for the copied disks to be left in the frozen state.

In particular, with reference to the figures, FIG. 1A–1C depict illustrative block diagrams of a conventional method for backing up data. First, FIG. 1A depicts copying the disks VOLID1 and VOLID2 by the fastest possible method (e.g. SnapShot). For simplicity's sake, the disk name (VOLID) is changed at the same time of the copy.

Next, as illustrated in FIG. 1B, the descriptors or identifiers of the files are adapted to the amended disk names in the appropriate database and file catalogs, as is currently performed by the IBM OS/390 operating system. The process of adapting the descriptors or identifiers of the files to the amended disk names can be very complicated, utilizes a substantial amount of time, and can lead to errors on the copied disks.

Thereafter, as depicted in FIG. 1C, the backup program can read the copied disks and produce data backups. However, the method of the prior art is disadvantageous in that any applications can read from and write to the copied disks, which is risky and undesirable.

An example of a Virtual Storage Extended/Enterprise Systems Architecture (VSE/ESA) installation operated by a fairly large user (a typical user of the SnapShot backup method) may contain 20 catalogs each covering 500 files (including database systems) and 200 alternative indices, distributed over some 50 to 100 disks. The average is therefore 75 disks utilized for a backup. Also, paths to the alternative indices and non-VSAM files are recorded. Therefore, the total number of disk changes involved in each backup is 12,640; giving a very clear picture of the amount of time involved in a backup and the risk of data being lost.

Another disadvantage of the prior art method, as depicted in FIG. 1C, is that the amended disks cannot be copied back in the event of a loss from the original (source) disks without first being changed back to the original disk identification.

Therefore, in view of the foregoing, it would be advantageous to provide a method and system for backing up and transmitting data which ensures that the times taken by breaks for backing up or transmitting data are as short as possible and it is ensured that the copied data cannot be altered.

SUMMARY OF THE INVENTION

In view of the foregoing, it is therefore an object of the present invention to provide an improved data processing system.

It is another object of the present invention to provide a method and system for fast backup and transmission of data.

It is yet another object of the present invention to provide a method and system for fast backup and transmission of data to ensure that the data cannot be altered.

In accordance with the present invention, the fastest possible one-to-one copying of data files which are to be backed up is performed from a source storage medium to a target storage medium. The data files include usable data and management data. After the copying, data held on the source storage medium is accessible to users during the backup. To perform the backup, a record table or synonym list provides access to the files which have been copied. From the record table, management data is temporarily replaced in order to meet access requirements for opening the copied data files at the target storage medium. The copied management data and useful data on the target storage medium remain unchanged. Advantageously, copied data files on the target storage medium can no longer be changed after copying and apart from the authorized backup program, no application can read the copied data files from the target storage medium.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
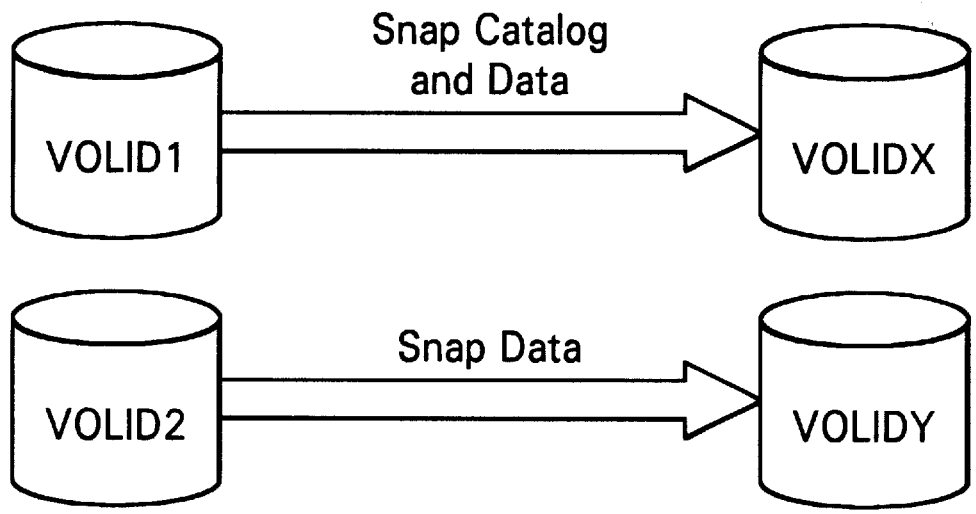
FIG. 1A–1C depict illustrative block diagrams of a prior art conventional method for backing up data.
Figure 1B:
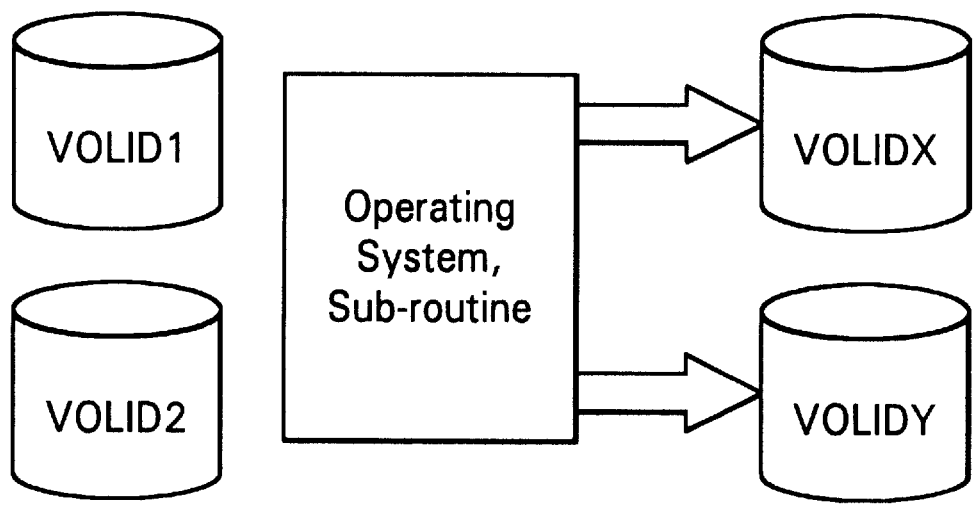
Figure 1C:
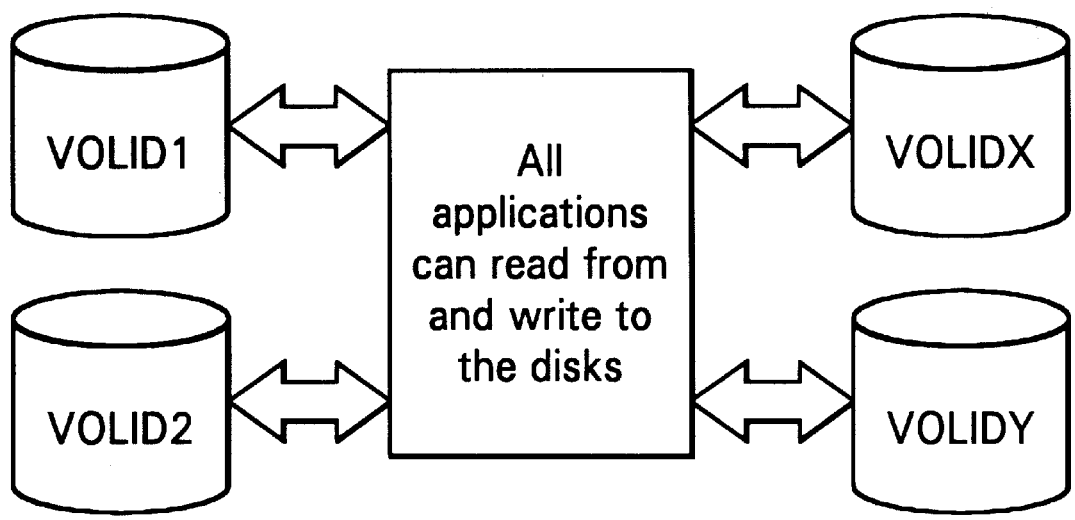
Figure 2A:
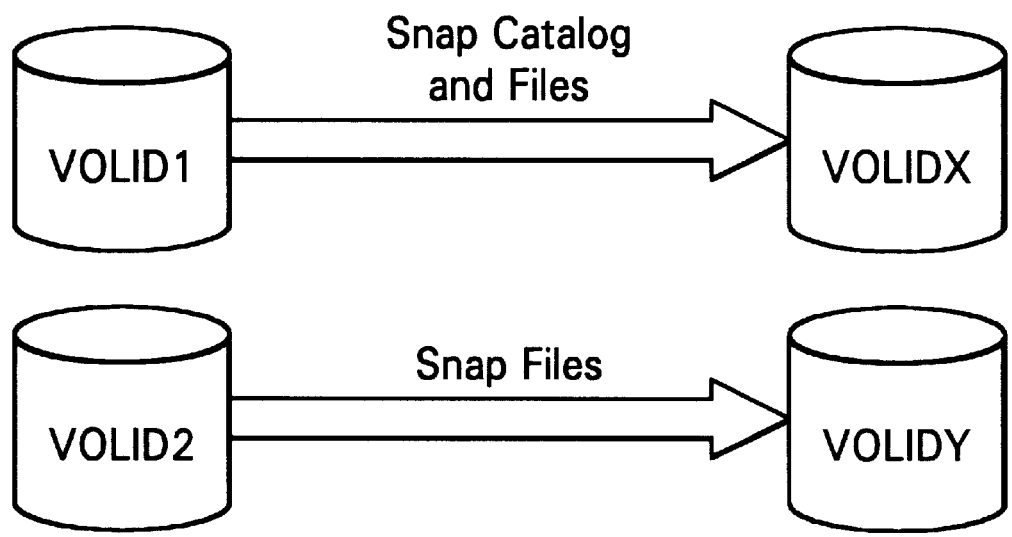
FIGS. 2A–2B illustrate illustrative block diagrams of a preferred embodiment of the method for backing up data according to the present invention.
Figures 2B, 3:
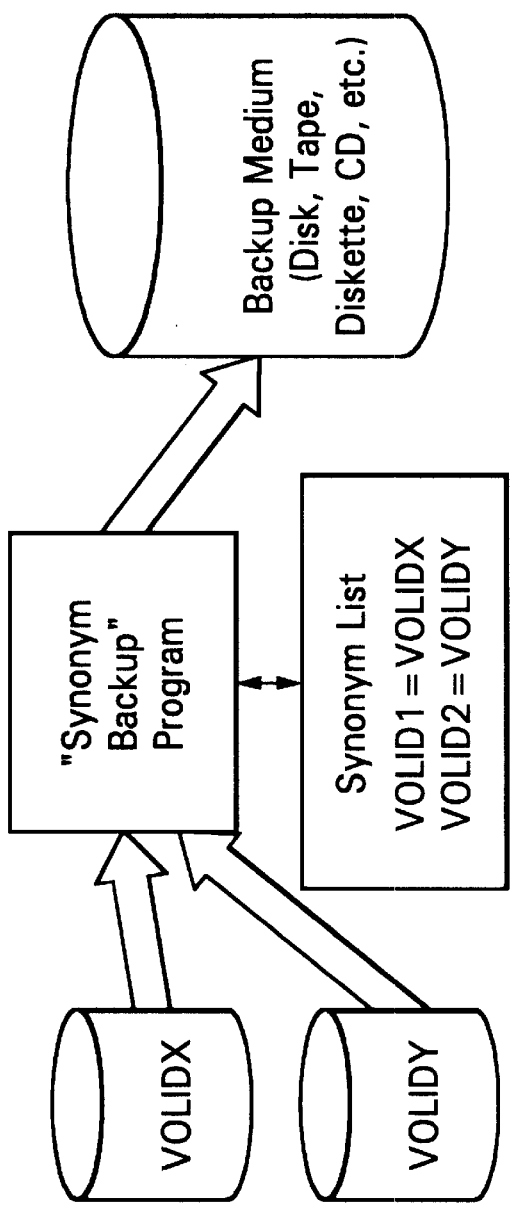
FIG. 3 depicts a chart of a backup synonym list as employed in FIGS. 2A–2B.

With reference now to the figures and in particular with reference to FIGS. 2A–2B, there is depicted illustrative block diagrams of a preferred embodiment of a method for backing up data according to the present invention.

In particular, the preferred embodiment illustrated in FIGS. 2A–2B provides a method for backing up data under the IBM VSE/ESA operating system. The IBM VSE/ESA operating system is designed for mainframes employing an S/390 architecture. The S/390 architecture is coming into increasingly widespread use as a server and database system for distributed applications. Where there are large amounts of data there is also a need for fast and regular backups of the data. Those skilled in the art will appreciate, however, that the invention is not limited to mainframe architecture.

In utilizing the IBM VSE/ESA operating system, the vast bulk of the data is processed and stored by the "VSE/VSAM" access method (IBM Virtual Storage Extended/Virtual Access Method). The file handling is centered on a group of catalogs which contain not data, but all the information on the files (i.e. management information). The files themselves are only accessible if required information can be made available from the catalogs. Strict security standards are imposed in this case and, for example, a check is always made to see whether the target disk has the same name (VOLID) as was recorded in the catalog entry relating to the file. Stringent checks are made the moment the catalogs are opened, e.g. the disk name has to be correct. The result of these checks is, for example, that copied disks whose names are different do not tally with the catalog entries. In addition, duplicated disk names are not permitted (if they were, the disk name of the copy could be left unaltered).

In particular, the present invention is suitable for making fast backups from disks which have been copied (e.g. by SnapShot), without the copied disks or their catalog entries being changed. As depicted in FIG. 2A, in a first step, a one-to-one copy is made of the data (useful data) which is to be backed up or transmitted, including the data catalogs (management data). The copying is preferably carried out by the fastest possible method, e.g. SnapShot. When the data is copied, the disk names are changed from VOLID1 to disk name VOLIDX and disk name VOLID2 to VOLIDY. The copied data is stored either on the same disk or a different disk within the system.

Because the catalogs (the management data) only know the old disk names "VOLID1" and "VOLID2" and the data on a new disk has been copied with a new disk name, the files on disks "VOLIDX" and "VOLIDY" cannot be opened, read from or written to by any application.

As illustrated in FIG. 2B, immediately after the disks have been copied (e.g. by SnapShot) all the applications can begin their normal day-to-day transactions with the original disks "VOLID1" and "VOLID2".

The data on the copied disks "VOLIDX" and "VOLIDY" is frozen because the information in the catalogs (management data) has not been adapted to the new disk names and/or logic addresses. In addition, the files names, file name extensions, directory names, or the name of computers in parallel or distributed networks have not been adapted to the new disk names and therefore are frozen on the copied disks.

Via the synonym list that is stored in non-volatile memory and loaded into volatile memory when the files are opened, the new backup program can make backups from the data on the new disks "VOLIDX" and "VOLIDY" at any desired time and the same is true of transmitting data to another data processing unit. The synonym list is either part of a backup program or else is separately available on a storage medium which the backup program accesses while opening files. In particular, the synonym list can be based on either the name function or the address function, depending on the nature of the operating system.

The temporary replacement by the synonym list takes place only in the volatile memory of the data processing unit, thus ensuring that the management data and useful data cannot be changed on the new disks "VOLIDX" and VOLIDY" when the files are opened. In addition, the backup program performs only a read function when opening the files.

In particular, in utilizing the method of backing up data according to the present invention, the VSE/VSAM file opening in the IBM VSE/ESA operating system is advantageously performed with the help of a synonym list. Internally in the IBM VSE/ESA operating system, a small interface is set up which detects that synonym backup is being utilized and that there is a synonym list present. According to entries of the synonym list, the catalog and file accesses required are diverted to the disks which have been copied (e.g. by SnapShot). It is important in this connection for the identifications of the files to be backed up to include not only their file names but also the disk name (VOLID) and the catalog name.

Referring now to FIG. 3, there is depicted a chart of a backup synonym list as employed in FIGS. 2A–2B. An element of the present invention is a table or so-called synonym list. The disk names or other identifiers which are needed are stored in this synonym list as pairs. Each original disk name has a fixed synonym name assigned to the original disk name; where other identifiers are used, the original identifier has a fixed synonym identifier assigned in the same way. The synonym list is either part of the data backup program or else is stored on a storage medium separately from the data backup program.

The files in question on the copied disks are not accessible to a normal application because the identifier or catalog entry does not fit, or in other words has not been adapted to the new disk. Therefore, an interface (hook) has to be incorporated in the relevant operating system which will detect the presence of the synonym list and will analyze its contents. This interface is simple and will typically be simpler than a subroutine which changes all the identifiers on the copied disks. The difficulties caused by having the identifiers changed by a subroutine are described in connection with the prior art.

In particular, one advantage of the method according to the present invention is that data holdings can no longer be changed after copying (they are "frozen" ). In addition, it is advantageous that apart from the authorized backup program, no application can change the data (the data is secure). Moreover, it is advantageous that even a considerable time later, the data held on a copied disk can still be used as a replacement for data which is actively being produced because the data which is held is clearly defined by the time of the copy (disaster recovery).

As depicted in FIG. 3, the synonym list for IBM VSE/ESA operating system contains source and target information. "SOURCE" (original storage medium) here means the point of departure or, in other words, the catalog of and disks forming the original storage medium, while "TARGET" (target storage medium) here means the target storage medium for the fast copy (e.g. made by SnapShot) including its catalog.

First, a copy of the disks is made. In particular, not all data on a disk needs to be copied at each backup, but a copy of only that data which has been altered or added since the last backup may be made. The data actively being produced on the source disks can be processed as soon as the copying has been completed.

The subsequent steps of the method for producing a backup can take place in parallel or in order with the processing of the active data:

1. A catalog synonym name must be loaded into the main catalog. The main catalog contains information on the names and disk names (addresses) of the data catalogs. The newly inserted catalog synonym points to the address of the copied catalog (disk address). This function is preferably performed by the "Import Connect" function which is part of the "IDCAMS" sub-routine of the VSE/ESA operating system. Another possibility would be for this functionality to be included in the backup program.

2. Via the main catalog, the backup program opens the copied catalog so that the backup program can obtain from the data in the copied catalog all the information on the files and the data contained in them. For this access, the synonym list is utilized so that the different names in the catalog, which would cause access to be refused, can be temporarily replaced.

3. With the help of the synonym list, the backup program opens all the files in the same way as it does the catalog by temporarily replacing the different disk names. The temporary replacement by the synonym list takes place only in the volatile memory of the data-processing unit, thus ensuring that the management data and useful data cannot be changed on the new disks "VOLIDX" and VOLIDY" when the files are opened. All the files having been opened with the help of the synonym list, it is ensured that the files or data on the copied disks (target disks) can only be read by the backup program.

4. The data in the files can now be read in the conventional manner and written to a backup storage medium.

Therefore, the synonym list ensures that access is possible to the copied data, changed to the source data are prevented, and backup can take place in parallel with the processing of the source data. In addition, the backup process can be standardized, i.e. the synonym list need not be constantly amended because backup jobs will be run every day or every night on the same files.

The following example shows the job control notation under IBM VSE/ESA:

```
// JOB BACKUP VSAM FILES from Snap Volumes
// ASSGN SYS005, 180
// DLBL IJSYSUC, 'VSESP.SNAP.CATALOG',,VSAM
// EXEC IDCAMS, SIZE=AUTO
/* Synonym Name for the snapped Catalog */ -
    IMPORT CONNECT OBJECTS((VSESP.SNAP.CATALOG -
        VOLUMES (VOL-X) DEVT(3390))) -
        CATALOG(MASTER.CATALOG)
/* Backup from IXFP/SnapShot volumes */ -
    BACKUP (*) -
    SYNLIST -
        SOURCEVOLUMES(VOL-1, VOL-2) -
        TARGETVOLUMES(VOL-X, VOL-Y) -
        CATALOG(VSESP.USER.CATALOG) -
        SYNCATALOG(VSESP.SNAP.CATALOG)
/*
/&
```

With the example, certain new backup parameters have been introduced:

SYNLIST indicates that "synonym backup" is being utilized and that there is a synonym list present.

SOURCEVOLUME(..) designates the group of source disks. The designated group of source disks are the producing disks.

TARGETVOLUMES(..) designates the target disks. It is to these target disks that the files and catalogs are copied. The source and target disks are considered to be pairs, positionally speaking.

CATALOG(..) designates the catalog relating to the source data.

SYNCATALOG(..) designates the synonym name of the copied catalog.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A system for backup of data files, said system comprising:
   a source storage medium having a source storage medium identifier, said source storage medium comprising a plurality of data files, wherein said plurality of data files comprise management data;
   a target storage medium to which said plurality of data files are copied, said target storage medium having a target storage medium identifier that is different from said source storage medium identifier;
   means for updating a record matching said source storage medium with said target storage medium;
   means for loading said record into a volatile memory of a data processing system in order to temporarily replace said management data at said target storage medium with said information from said record, in response to a request to backup said plurality of copied data files from said target storage medium to a backup storage medium; and
   means for temporarily replacing said management data at said target storage medium with information from said record in order to meet access requirements for opening said plurality of data files at said target storage medium, such that said opened plurality of data files are enabled for transmittal to said backup storage medium.

2. The system for backup of data files according to claim 1, said system further comprising:
   means for copying said plurality of data files from said source storage medium to said target storage medium.

3. The system for backup of data files according to claim 1, wherein said source storage medium and said target storage medium are included in a data processing system.

4. The system for backup of data files according to claim 1, wherein said source storage medium and said target storage medium are physically separate storage media.

5. The system for backup of data files according to claim 1, wherein said source storage medium and said target storage medium form are physically a single storage media.

6. The system for backup of data files according to claim 1, wherein said means for temporarily replacing said management data at said target storage medium with information from said record further comprises:
   means for searching for directory information in said management data at said target storage medium which does not meet access requirements for opening said plurality of copied data files from said target storage medium; and
   means for temporarily replacing said directory information which does not meet said access requirements with said information from said record in order to meet said access requirements and enable opening of said plurality of copied data files for transmittal to said backup storage medium.

7. The system for backup of data files according to claim 6, said means for searching for directory information in said management data at said target storage medium which does not meet access requirements for opening said plurality of copied data files from said target storage medium further comprising:
   means for searching for a name of said source storage medium.

8. The system for backup of data files according to claim 6, said means for searching for directory information in said management data at said target storage medium which does not meet access requirements for opening said plurality of copied data files from said target storage medium further comprising:
   means for searching for a logic address of said source storage medium.

9. The system for backup of data files according to claim 1, said means for updating a record matching said source storage medium with said target storage medium, further comprising:
   means for storing said record in a non-volatile memory of said data processing system.

10. The system for backup of data files according to claim 1, said means for temporarily replacing said management data at said target storage medium with information from said record, further comprising:
    means for temporarily replacing said management data at said target storage medium in said volatile memory of said data processing system, such that said plurality of copied data files are opened unchanged from said target storage medium.

11. The system for backup of data files according to claim 1, said system further comprising:
    means for enabling only a backup program comprising said record to read said plurality of copied data files from said target storage medium.

12. The system for backup of data files according to claim 1, said system further comprising:
    means for changing a name of said target storage medium when copying said plurality of data files from said source storage medium to said target storage medium.

13. The system for backup of data files according to claim 1, wherein said plurality of data files comprise management data and useful data.

14. A method for automatic backup of data files, said method comprising the step of:
    copying a plurality of data files from a source storage medium to a target storage medium, said source storage medium and said target storage medium having different identifiers, wherein said plurality of data files comprises management data;
    updating a record matching said source storage medium with said target storage medium;
    loading said record into a volatile memory of a data processing system in order to temporarily replace said management data at said target storage medium with said information from said record, in response to a request to backup said plurality of copied data files from said target storage medium to a backup storage medium; and
    temporarily replacing said management data at said target storage medium with information from said record, such that access requirements for opening said plurality of data files are met from said record in order to enable transmittal of said plurality of data files from said target storage medium to said backup storage medium.

15. The method for automatic backup of data files according to claim 14, wherein said step of temporarily replacing said management data at said target storage medium with information from said record further comprises the steps of:

搜 searching for directory information in said management data at said target storage medium which does not meet access requirements for opening said plurality of copied data files from said target storage medium; and temporarily replacing said directory information which does not meet said access requirements with said information from said record in order to meet said access requirements and enable opening of said plurality of copied data files for transmittal to said backup storage medium.

16. The method for automatic backup of files according to claim 15, said step of searching for directory information in said management data at said target storage medium which does not meet access requirements for opening said plurality of copied data files from said target storage medium further comprising the step of:

searching for a name of said source storage medium.

17. The method for automatic backup of files according to claim 15, said step of searching for directory information in said management data at said target storage medium which does not meet access requirements for opening said plurality of copied data files from said target storage medium further comprising the step of:

searching for a logic address of said source storage medium.

18. The method for automatic backup of files according to claim 14, said step of updating a record matching said source storage medium with said target storage medium, further comprising the step of:

storing said record in a non-volatile memory of said data processing system.

19. The method for automatic backup of files according to claim 14, said step of temporarily replacing said management data at said target storage medium with information from said record, further comprising the step of:

temporarily replacing said management data at said target storage medium in said volatile memory of said data processing system, such that said plurality of copied data files are opened unchanged from said target storage medium.

20. The method for automatic backup of files according to claim 14, said method further comprising the step of:

enabling only a backup program comprising said record to read said plurality of copied data files from said target storage medium.

21. The method for automatic backup of files according to claim 14, said method further comprising the step of:

changing a name of said target storage medium when copying said plurality of data files from said source storage medium to said target storage medium.

22. The method for automatic backup of files according to claim 14, said step of copying a plurality of data files from a source storage medium to a target storage medium, further comprising the step of:

copying a plurality of data files wherein said plurality of data files comprise said management data and useful data.

23. A computer program product to provide backup of data files, said program product comprising:

a storage medium; and program instructions on said storage medium for:

copying a plurality of data files from a source storage medium to a target storage medium, said source storage medium and said target storage medium having different identifiers, wherein said plurality of data files comprise management data;

updating a record matching said source storage medium with said target storage medium;

loading said record into a volatile memory of a data processing system in order to temporarily replace said management data at said target storage medium with said information from said record, in response to a request to backup said plurality of copied data files from said target storage medium to a backup storage medium; and temporarily replacing said management data at said target storage medium within information from said record, such that access requirements for opening said plurality of data files are met in order to enable transmittal of said plurality of data files from said target storage medium to said backup storage medium.

24. The computer program product according to claim 23, wherein said program instructions for temporarily replacing said management data at said target storage medium with information from said record further include program instructions for:

searching for directory information in said management data at said target storage medium which does not meet access requirements for opening said plurality of copied data files from said target storage medium; and temporarily replacing said directory information which does not meet said access requirements with said information from said record in order to meet said access requirements and enable opening of said plurality of copied data files for transmittal to said backup storage medium.

25. The computer program product according to claim 24, wherein said program instructions for searching for directory information in said management data at said target storage medium which does not meet access requirements for opening said plurality of copied data files from said target storage medium further comprise program instructions for:

searching for a name of said source storage medium.

26. The computer program product according to claim 24, wherein said program instructions for searching for directory information in said management data at said target storage medium which does not meet access requirements for opening said plurality of copied data files from said target storage medium further comprise program instructions for:

searching for a logic address of said source storage medium.

27. The computer program product according to claim 23, wherein said program instructions for updating a record matching said source storage medium with said target storage medium, further comprise program instructions for:

storing said record in a non-volatile memory of said data processing system.

28. The computer program product according to claim 23, said program instructions for temporarily replacing said management data at said target storage medium with infor mation from said record, further comprising program instructions for:

temporarily replacing said management data at said target storage medium in said volatile memory of said data processing system, such that said plurality of copied data files are opened unchanged from said target storage medium.

29. The computer program product according to claim 23, further comprising program instructions for:

enabling only a backup program comprising said record to read said plurality of copied data files from said target storage medium.

30. The computer program product according to claim 23, further comprising program instructions for:

changing a name of said target storage medium when copying said plurality of data files from said source storage medium to said target storage medium.

* * * * *